3,387,063
SULFUR-VULCANIZABLE BLENDS OF ETHYL-
ENE-BUTADIENE COPOLYMER AND BUTYL
OR EPD RUBBER
Fay W. Bailey, Bartlesville, Okla., assignor to Phillips
Petroleum Company, a corporation of Delaware
No Drawing. Filed Mar. 29, 1966, Ser. No. 538,244
6 Claims. (Cl. 260—888)

This invention relates to vulcanizable blends of ethylene-butadiene copolymer. In one aspect, it relates to novel blends having adequate induction time to permit shaping and fabrication. In another aspect, the invention relates to novel blends having high solvent resistance.

In the shaping and forming of compounded vulcanizable resins or resin blends it is necessary that adequate time be available for such operations before crosslinking occurs. It is apparent that if premature crosslinking occurs, there will not be sufficient time for blow molding, extrusion, and similar shaping or forming operations. One means of determining whether sufficient time is available for shaping is to determine shear modulus as a function of time. In the plot of shear modulus versus time as determined in an Agfa Vulcameter there is a first relatively flat line followed by a rapidly rising line and then by another relatively flat line. The time corresponding to the intersection of straight lines drawn through the first two parts of the curve is called the induction time and is used to determine whether there is adequate time for shaping and forming of the material. Times of at least 5 minutes are desirable.

The solvent resistance of rubbery compositions is important where the composition is contemplated for use in an environment wherein the materials will be exposed to same. For many purposes in construction plant operations and the like, the operations are such that rubbery compositions are required to minimize the hazards which would otherwise exist. For example, rubbery compositions as are employed on electrical wiring when present in areas where the wire is apt to be in contact with some type of solvent must be solvent resistant so as to prevent deterioration of the protective covering of the wire.

Thus, it is an object of the present invention to provide novel vulcanized blends of ethylene-butadiene copolymer which exhibit not only good solvent resistance but also adequate induction time.

Other objects, aspects and the several advantages of this invention will be apparent from a study of the disclosure and the appended claims.

I have now discovered in accordance with this invention that vulcanizable blends of ethylene-butadiene copolymer and either ethylene-propylene rubber or butyl rubber have higher solvent resistance and higher induction times than similar blends of ethylene-butadiene copolymer with conventional rubbery compounds such as emulsion polymerized butadiene-styrene rubber.

The ethylene-diene copolymers used in the present invention are formed from ethylene and conjugated diolefins having a terminal double bond with chromium oxide-containing catalyst as disclosed in U.S. 2,825,721. The diolefin content of the polymers can be from 0.5 to 5 weight percent. The preferred conjugated diolefin is 1,3-butadiene, but other dienes such as 1,3-pentadiene, 1,3-octadiene, and the like, can be used. In addition, from 0.5 to 5 weight percent of other 1-olefin such as propylene, butene-1, hexene-1, octene-1, or the like can be present in the copolymer.

Sulfur curable ethylene-propylene termonomer rubbers which can be used in the present invention are prepared by use of catalysts generally known as coordination catalysts. These are made from components of two types; first, compounds of the transition heavy metals of Groups IV, V and VI beginning with titanium, vanadium and chromium; and, second, organometallic compounds, hydrides and free metals of Groups I, II and III. The compounds of the first type are preferably halides, oxyhalides and alcoholates, the preferred metals being titanium and vanadium. The metals of the component of the second type are preferably lithium, sodium, magnesium and aluminum and the organic portions are preferably alkyl radicals. In these organometallic compounds the valences of the metal may be partly satisfied by halogen or alkoxy, provided, of course, that at least one bond connects the metal with a carbon atom. Mixtures of two or more compounds of the type described above may often be used to advantage. These catalysts are not the subject of the present invention.

As is well known, these catalysts are poisoned by oxygen, water, or other material with which they react, and for this reason the solvents must be substantially free of these materials. The preferred solvents are the saturated aliphatic and hydroaromatic hydrocarbons and certain nonreactive halogen compounds such as tetrachloroethylene and chlorobenzenes. These solvents conveniently serve as the medium in which polymerization of the olefins can be carried out. The polymerization normally will be carried out at ordinary temperatures and pressures, although it is usually convenient to allow the temperature to rise spontaneously to from 50° to 60° C. due to the heat of the reaction. The rate of the reaction may be increased by the use of increased pressures, for instance, up to 1000 atmospheres or above, or by increased temperatures up to 150° C., although it is to be understood that elevated temperatures and pressures are not required. Where found desirable, the polymerization can be carried out at lower temperatures and pressures. For example, temperatures as low as —100° F. can be employed.

The third component or the ethylene-propylene terpolymer is an acyclic or cyclic noncounjugated diene containing 5 to 22 carbon atoms. Examples of suitable diolefins in which the double bonds are terminal are 1,4-pentadiene, 1,5-hexadiene (biallyl), 2-methyl-1,5-hexadiene, 3,3-dimethyl - 1,5-hexadiene, 1,7-octadiene, 1,9-decadiene, 1,19-eicosadiene, and the like. Other nonconjugated dienes such as dicyclopentadiene can also be used. A preferred form of the present invention, however, involves diolefins in which only one double bond is terminal. The latter are preferred because both double bonds of diolefins in which all the unsaturation is terminal tend to be used up in the copolymerization with the monoolefins, thus reducing the residual unsaturation which is required for good curing properties. Hence, large initial proportions of these particular diolefins are often desirable. On the other hand, it has been found that when one double bond of the diolefin is internal and is preferably also shielded by alkyl groups, it does not react in the copolymerization but remains intact in the product, and that these internal double bonds still make the product readily vulcanizable with sulfur. Examples of diolefins with only one terminal double bond are 1,4-hexadiene, 1,9-octadecadiene and the like. Also of interest are 6-methyl-1,5-heptadiene, 7-methyl - 1,6 - octadiene, 11-ethyl-1,11-tridecadiene, and similar compounds in which the internal double bond is shielded. The interpolymers of the present invention contain from about 1 to about 40 mol percent of the diolefin, and preferably from 1 to 15 mol percent. Larger proportions of the diolefin are usually used in the polymerization when double bonds of the diolefin are terminal, as explained above. This proportion of diolefin in the total monomers subjected to polymerization will give a product with an iodine number between 3 and 5. Under certain conditions and with a given catalyst concentration it is possible to secure practically complete polymerization of the mono- and diolefins, which polymers contain unsaturation equivalent to an iodine number of at least 3. It is sometimes more economical, however, to use a smaller proportion of catalyst, terminate at less than complete conversion, and to recover the unreacted monomers.

A mixture of ethylene and propylene of approximately equimolecular proportion is particularly useful in giving products with rubber-like properties of the kind desired. Since, however, the interpolymers containing too large a portion of ethylene are deficient in plasticity, the proportion of the ethylene therein should not be more than 75 percent by weight.

The monomers may be added gradually to the catalyst solution, or they may all be added entirely at the start of the reaction, or one or more may be added at the start and the other (or others) may be added gradually. More catalyst may be added during the reaction, if found to be desirable. All of the processes, including making the catalyst, and isolating and purifying the product, may be carried out continuously.

The butyl rubber employed in the blends of this invention is formed by copolymerization of a large proportion of olefin such as isobutylene with a small proportion of diolefin such as isoprene using a Friedel-Crafts type catalyst as described in a matter described in U.S. Patent 2,356,128 and U.S. Patent 2,356,301. Generally, the butyl rubber will contain from 98.5 to 95.5 isobutylene and from 1.5 to 4.5 percent isoprene.

The compositions of this invention contain 1 to 50 percent butyl rubber or EPT rubber and 99 to 50 ethylene-butadiene copolymer, based on the total of these components in the mixture. The compounding of the two components can be carried out by any of the processes known to the industry.

It is within the scope of the invention to incorporate known fillers, vulcanizing accelerators, activators, softeners, antioxidants, dyes, pigments and the like in the blends. In particular, large amounts of reinforcing fillers such as carbon black can be incorporated in the blends of the invention.

The following examples are given to further illustrate the invention.

Example I

A series of blends of an ethylene-butadiene copolymer made with chromium oxide catalyst according to U.S. 2,825,721 and containing about 2 percent butadiene was made with each of the following rubbers:

(A) EPT—An ethylene-propylene-1,4-hexadiene terpolymer made by the process of U.S. 2,933,480 by Du Pont and identified as Nordel 1040, Mooney viscosity (ML-4 at 212° F.) was about 40.

(B) Butyl—An isobutylene-isoprene copolymer made by Enjay Chemical Company. That used in Example I was identified as Butyl 035 and had a Mooney viscosity (ML-4 at 212° F.) of about 45. That used in Example II was identified as Butyl 218 and had a Mooney viscosity (ML-3 at 260° F.) of about 55. Mooney viscosities were determined by ASTM D 1646-65.

(C) SBR—Emulsion butadiene/styrene copolymer made by the 1502 recipe of ASTM D 1419-61T.

In the following recipe:

| | Parts by weight |
|---|---|
| Ethylene-butadiene copolymer | variable |
| Rubber | variable |
| Carbon black (medium thermal black) | 25 |
| Stearic acid | 1 |
| ZnO | 5 |
| N-oxydiethyl-2-benzothiazyl sulfenamide | 1.5 |
| Sulfur | 1.5 |

Blending was done on a two roll mill at 310° F. using the following procedure:

(1) The ethylene-butadiene copolymer and rubber were fluxed together.
(2) Black was added.
(3) Zinc oxide, stearic acid and N-oxydiethyl-2-benzothiazyl sulfenamide were added and mixed for 3 minutes.
(4) Sulfur was added and mixed for 3 minutes.
(5) The samples were removed from the mill and cured 25 minutes at 350° F.

The blends had the following properties:

| | Parts by weight | | | | | | | | | | | |
|---|---|---|---|---|---|---|---|---|---|---|---|---|
| Ingredients: | | | | | | | | | | | | |
| Ethylene-butadiene copolymer | 100 | 75 | 50 | 25 | 0 | 75 | 50 | 25 | 0 | 75 | 50 | 25 | 0 |
| Butyl | 0 | 25 | 50 | 75 | 100 | 0 | 0 | 0 | 0 | 0 | 0 | 0 | 0 |
| SBR | 0 | 0 | 0 | 0 | 0 | 0 | 0 | 0 | 0 | 25 | 50 | 75 | 100 |
| EPT | 0 | 0 | 0 | 0 | 0 | 25 | 50 | 75 | 100 | 0 | 0 | 0 | 0 |
| Induction time, minutes | 9 | 9.6 | 8.3 | 8.0 | 8.5 | 8 | 7.6 | 7.0 | 8.5 | 3.5 | 3.3 | <3 | <3 |
| Elongation:[1] | | | | | | | | | | | | | |
| After 70 hours in toluene at 80° F. | 520 | 660 | 560 | 590 | 370 | 730 | 610 | 550 | (²) | 320 | 330 | 220 | (²) |

[1] ASTM D 638-61T.
² Crumbled.

The above data clearly demonstrate that the compositions formed in accordance with the present invention exhibit not only adequate induction time but likewise have synergistically improved solvent resistance as measured by the elongation of the blend after being in toluene at room temperature for 70 hours as compared with more conventional rubbery materials such as SBR.

Example II

An ethylene-butadiene copolymer similar to that used in Example I and an ethylene-butene-1 copolymer made by the same process and containing about 2 percent butene-1 were each blended with EPT rubber and with butyl rubber in the following recipe:

| | Parts by weight |
|---|---|
| Ethylene copolymer | 200 |
| Rubber | 40 |
| Thermax MT | 50 |
| ZnO | 10 |
| Stearic acid | 2 |
| N-oxydiethyl-2-benzothiazyl sulfenamide | 3 |
| Sulfur | 3 |

Blending was done on a 2-roll mill using the following procedure:

(1) The ethylene copolymer was fluxed on the mill at 300° to 310° F. until melted.
(2) The rubber was added and mixed 2 minutes.
(3) The carbon black was added and mixed 2 minutes.
(4) The zinc oxide, stearic acid, and Amax were added and mixed 3 minutes.
(5) The sulfur was added and mixed 3 minutes.
(6) The sample was removed from the mill and cured 25 minutes at 350° F.

The blends had the following deformations under load at 302° F. by ASTM D 734—60:

| Ethylene-Butene-1 Copolymer [1] | | Ethylene-Butadiene Copolymer | |
|---|---|---|---|
| With EPT | With Butyl | With EPT | With Butyl |
| 95 | 97 | 17 | 27 |

[1] No cure was obtained on these blends.

These data show that unsaturation is necessary in the ethylene copolymer to obtain crosslinking with the rubber.

Reasonable variations and modifications are possible within the scope of the foregoing disclosure, and the appended claims to the invention.

I claim:

1. A sulfur vulcanizable blend of an ethylene-butadiene copolymer comprising from about 0.5 to about 5 weight percent polymerized butadiene and a rubbery copolymer selected from (a) ethylene-propylene-diene terpolymer, and (b) isobutylene-isoprene copolymer wherein said rubbery copolymer is present in an amount in the range of 1 to 50 percent by weight and said ethylene-butadiene copolymer is present in an amount in the range of 99 to 50 weight percent, based on the total of these components in the mixture.

2. A blend according to claim 1 consisting of an ethylene-butadiene copolymer and an ethylene-propylene-diene-terpolymer wherein said diene is a member of the group consisting of cyclic dienes and acyclic dienes having 5 to 22 carbon atoms.

3. A blend according to claim 2 wherein said diene is dicyclopentadiene.

4. A blend according to claim 2 wherein said diene is 1,4-hexadiene.

5. A blend according to claim 1 consisting of an ethylene-butadiene copolymer and an isobutylene-isoprene copolymer.

6. A blend according to claim 5 wherein said isobutylene-isoprene copolymer contains from 98.5 to 95.5 percent isobutylene and from 1.5 to 4.5 percent isoprene.

References Cited

UNITED STATES PATENTS

| | | | |
|---|---|---|---|
| 3,055,875 | 9/1962 | Walther | 260—85.3 |
| 3,184,522 | 5/1965 | Zagar | 260—889 |
| 3,224,985 | 12/1965 | Gladding et al. | 260—5 |

MURRAY TILLMAN, *Primary Examiner.*

M. J. TULLY, *Assistant Examiner.*